US005148204A

United States Patent [19]

Rezanka

[11] Patent Number: 5,148,204

[45] Date of Patent: Sep. 15, 1992

[54] APERTURELESS DIRECT ELECTRONIC PRINTING

[75] Inventor: Ivan Rezanka, Pittsford, N.Y.

[73] Assignee: Xerox Corporation, Stamford, Conn.

[21] Appl. No.: 661,961

[22] Filed: Feb. 28, 1991

[51] Int. Cl.$^5$ .............................................. G01D 15/06

[52] U.S. Cl. .................................. 346/153.1; 346/155

[58] Field of Search .............................. 346/153.1-155

[56] References Cited

U.S. PATENT DOCUMENTS

| | | | |
|---|---|---|---|
| 3,689,935 | 9/1972 | Pressman et al. | 346/74 ES |
| 3,816,840 | 6/1974 | Kotz | 346/154 |
| 4,454,520 | 6/1984 | Braschler | 346/153.1 |
| 4,491,855 | 1/1985 | Fujii et al. | 346/159 |
| 4,568,955 | 2/1986 | Hosoya et al. | 346/153.1 |
| 4,641,955 | 2/1987 | Yuasa | 346/153.1 |
| 4,743,926 | 5/1988 | Schmidlin et al. | 346/159 |
| 4,755,837 | 7/1988 | Schmidlin et al. | 346/155 |
| 4,814,796 | 3/1989 | Schmidlin | 346/155 |
| 4,912,489 | 3/1990 | Schmidlin | 346/159 |

*Primary Examiner*—George H. Miller, Jr.

[57] ABSTRACT

Apertureless Direct Electronic Printing (ADEPT) is effected through imagewise toner transfer across a gap by biasing individual electrodes selectively using a localized electrostatic field varying in time in such a way that the approximate impulse relation 1:2 is maintained, between the first, forward directing pulse and the subsequent reverse pulse (or a sequence of alternating pulses). In this improvement, no apertures between the donor and the receiver are utilized, yet imagewise resolution is preserved. In other words undesirable defocusing is preclude. The electrodes, in one embodiment, are implemented as biased discs embedded in a dielectric substrate material.

6 Claims, 6 Drawing Sheets

APERTURELESS DIRECT ELECTRONIC PRINTING

BACKGROUND OF THE INVENTION

This invention relates to electrostatic printing devices and more particularly to non-impact printing devices which utilize electronically addressable electrodes for depositing developer in image configuration on plain paper substrates.

Of the various electrostatic printing techniques, the most familiar and widely utilized is that of xerography wherein latent electrostatic images formed on a charge retentive surface are developed by a suitable toner material to render the images visible, the images being subsequently transferred to plain paper.

A lesser known form of electrostatic printing is one that has come to be known as Direct Electrostatic Printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sep. 5, 1972 to Gerald L. Pressman et al. In general, this type of printing device uses electrostatic fields associated with addressable electrodes for allowing passage of developer material through selected apertures in a printhead structure. Additionally, electrostatic fields are used for attracting developer material to an imaging substrate in image configuration.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fuji et al discloses a method and apparatus utilizing a controller having a plurality of openings or slit-like openings to control the passage of charged particles and to record a visible image of charged particles directly on an image receiving member. Specifically, disclosed therein is an improved device for supplying the charged particles to a control electrode that has allegedly made high-speed and stable recording possible. The improvement in Fuji et al lies in that the charged particles are supported on a supporting member and an alternating electric field is applied between the supporting member and the control electrode. Fuji et al purports to obviate at least some of the problems noted above with respect to Pressman et al. Thus, Fuji et al alleges that their device makes it possible to sufficiently supply the charged particles to the control electrode without scattering them.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a plurality of addressable recording electrodes and corresponding signal sources connected thereto for attracting the developer on the developing roller to the ordinary sheet by generating an electric field between the ordinary sheet and the developing roller according to the image information. A plurality of mutually insulated electrodes are provided on the developing roller and extend therefrom in one direction. A.C. and D.C. voltage sources are connected to the electrodes, for generating alternating electric fringe fields between adjacent ones of the electrodes to cause oscillations of the developer positioned between the adjacent electrodes along electric lines of force therebetween to thereby liberate the developer from the developing roller.

Direct electrostatic printing (DEP) structures are particularly attractive due to reduced manufacturing costs and increased reliability opportunities in nonimpact electronic printing. DEP printing systems which utilize apertured printhead structures such as those of Pressman et al and Fuji et al have the potential problem of reduced performance due to aperture clogging. Aperture clogging is caused by wrong sign toner accumulating on the control electrode structure of the apertured printhead structure. A typical printhead structure comprises a shield electrode structure and a control electrode structure which are supported on opposite sides of an insulating member. The printhead structure together with a suitable supply of toner particles and appropriate electrical bias voltages are usually arranged such that the shield electrode structure faces the toner supply.

The problem of aperture clogging through accumulation of wrong sign toner particles on the control electrode structure is addressed in a number of patents. Generally, the problem is solved by minimizing the amount of wrong sign toner in the toner supply or by the provision of structure for cleaning or removing toner from the control electrode structure.

U.S. Pat. No. 4,743,926 granted to Schmidlin et al on May 10, 1988 and assigned to the same assignee as the instant invention discloses an electrostatic printing apparatus including structure for delivering developer or toner particles to a printhead forming an integral part of the printing device. Alternatively, the toner particles can be delivered to a charge retentive surface containing latent images. The developer or toner delivery system is adapted to deliver toner containing a minimum quantity of wrong sign and size toner. To this end, the developer delivery system includes a pair of charged toner conveyors which are supported in face-to-face relation. A bias voltage is applied across the two conveyors to cause toner of one charge polarity to be attracted to one of the conveyors while toner of the opposite is attracted to the other conveyor. One of charged toner conveyors delivers toner of the desired polarity to an apertured printhead where the toner is attracted to various apertures thereof from the conveyor.

In another embodiment of the '926 patent a single charged toner conveyor is supplied by a pair of three-phase generators which are biased by a DC source which causes toner of one polarity to travel in one direction on the electrode array while toner of the opposite polarity travels generally in the opposite direction.

In an additional embodiment disclosed in the '926 patent, a toner charging device is provided which charges uncharged toner particles to a level sufficient for movement by one or the other of the aforementioned charged toner conveyors.

U.S. Pat. No. 4,814,796 granted to Fred W. Schmidlin on Mar. 3, 1989 and assigned to the same assignee as the instant invention discloses a direct electrostatic printing apparatus including structure for delivering developer or toner particles to a printhead forming an integral part of the printing device. The printing device includes, in addition to the printhead, a conductive shoe which is suitably biased during a printing cycle to assist in the electrostatic attraction of developer through apertures in the printhead onto the copying medium disposed intermediate the printhead and the conductive shoe. The structure for delivering developer or toner is adapted to deliver toner containing a minimum quantity of wrong sign toner. To this end, the developer delivery system includes a conventional magnetic brush which delivers toner to a donor roll structure which, in turn, delivers toner to the vicinity of apertures in the printhead structure.

U.S. Pat. No. 4,755,837 granted to Fred W. Schmidlin on Jul. 5, 1988 and assigned to the same assignee as the instant invention discloses a direct electrostatic printing apparatus including structure for removing wrong sign developer particles from a printhead forming an integral part of the printing device. The printing device includes, in addition to the printhead, a conductive shoe which is suitably biased during a printing cycle to assist in the electrostatic attraction of developer passing through apertures in the printhead onto the copying medium disposed intermediate the printhead and the conductive shoe. During a cleaning cycle, the printing bias is removed from the shoe and an electrical bias suitable for creating an oscillating electrostatic field which effects removal of toner from the printhead is applied to the shoe.

U.S. Pat. No. 4,912,489 discloses a Direct Electrostatic Printing device comprising a printhead structure comprising a shield electrode structure and a control electrode structure supported by an insulative support member. The printhead structure is positioned such that the control electrode is opposite the toner supply. Wrong sign toner accumulates on the control electrode.

Circumventing the possibility of plugged channels in the apertures of a printhead makes the non-aperture systems such as that disclosed in Hosoya et al attractive. However, the Hosoya et al apertureless printing structure is seen to produce relatively row resolution images due to the construction of their recording electrode structure.

U.S. patent application Ser. No. 07/525,926 filed May 21, 1990 in the name of Dan A. Hays and assigned to the same assignee as the present invention discloses Direct Electrostatic Printing (DEP) without the use of an apertured printhead structure wherein such printing is accomplished by supplying mechanical energy in an imagewise manner via AC fringe fields coupled to a toned donor member. Hays teaches the imagewise toner deposition by a time dependent, electrostatic fringe field from an electrode pair behind a donor toned with charged toner particles. Hays addresses the question of overcoming the adhesion forces by the local AC fringe field in the presence of DC electric field applied across the gap.

BRIEF DESCRIPTION OF THE INVENTION

Briefly, the present invention provides a non-contact printing device in the form of an Apertureless Direct Electrostatic Printer (ADEPT) wherein imagewise toner deposition is accomplished with relatively high image resolution.

The loss of imagewise resolution or defocussing, generally caused by the gap transfer in the presence of fringing AC field, in addition to the uniform collecting DC field, is prevented and controlled by a predetermined temporal structure of the AC fringing field. I have discovered that there is an approximate impulse relation between the first, forward directing pulse and the subsequent reverse pulse (or a sequence of subsequent reversed and forward pulses) for which the resolution is essentially preserved in the apertureless gap transfer.

The approximate impulse relation is 1:2; that is, the time integral of the amplitude of the first pulse, at the beginning of which the toner particle at rest is seeded on the trajectory in the gap, is one half of the time integral of the subsequent pulse (or pulses) when the direction of the electrical field reverses (or alternates). The foregoing concept together with the detachment of toner by imagewise AC fringe fields can be advantageously used in combination. In addition, I have demonstrated by numerical experiments that the resolution can be adequately preserved over a large range of seeding times (meaning the toner detachment times); hence, this novel process exhibits enough latitude in important process variables to become a foundation of a robust direct marking technology which I refer to as ADEPT.

Even more generally, the principle of predetermined temporal structure of localized fields can be used in any toner gap transfer, optimized to any specific initial or intermediate conditions of toner trajectories.

It was shown by theoretical analysis that a simple disk electrode, embedded in a grounded plane, can be used to generate a strong enough fringing field on the toner side of the donor. By covering the electrode and the ground plane by a dielectric layer, and by matching the diameter of the electrode with the thickness of the layer in a predetermined way, a desirable field profile can be achieved on the surface of dielectric. The surface of the dielectric represents the toner side of the toner donor. Electrodes of this nature lend themselves to advantageous integration with the driving electronics. Therefore, it is proposed to integrate a multielectrode writing bar, consisting of electrodes described here, with the driving electronics, and eventually, with the input device.

Electrical forces have been analyzed, acting on a charged toner particle placed on a dielectric layer covering a conducting plane, this plane being one side of a biased gap. It was shown, that the total detachment force, resulting from the detaching Coulomb force and two holding forces, image and polarization forces, can be maximized for the toner with tribo in the vicinity of 10 μC/g with basing, which is well achievable with present materials and electronics.

DETAILED DESCRIPTION OF THE DRAWINGS

Figure 7:
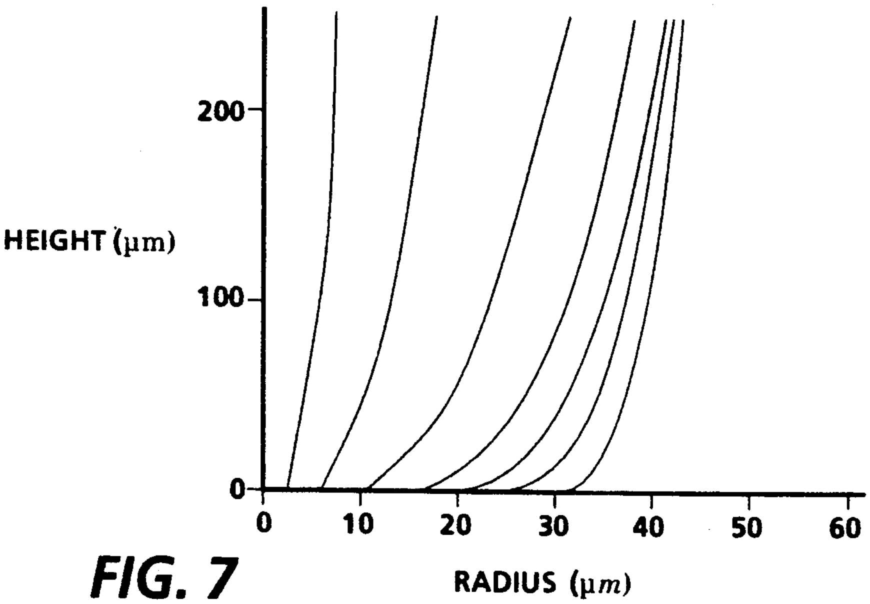
Figure 8:
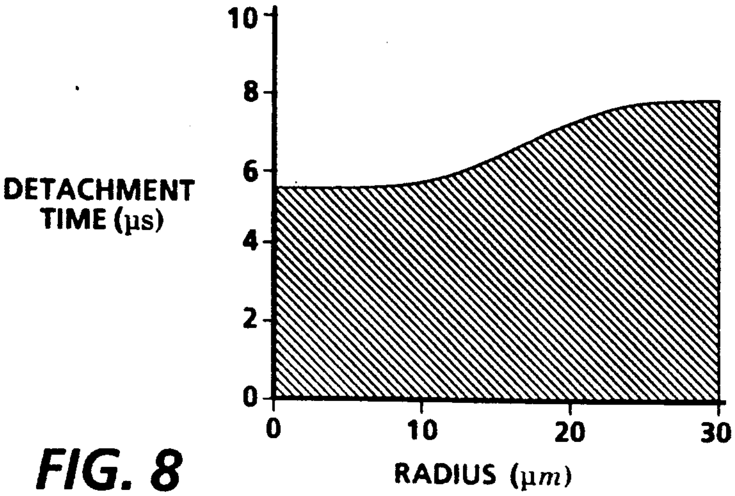
Figure 9:
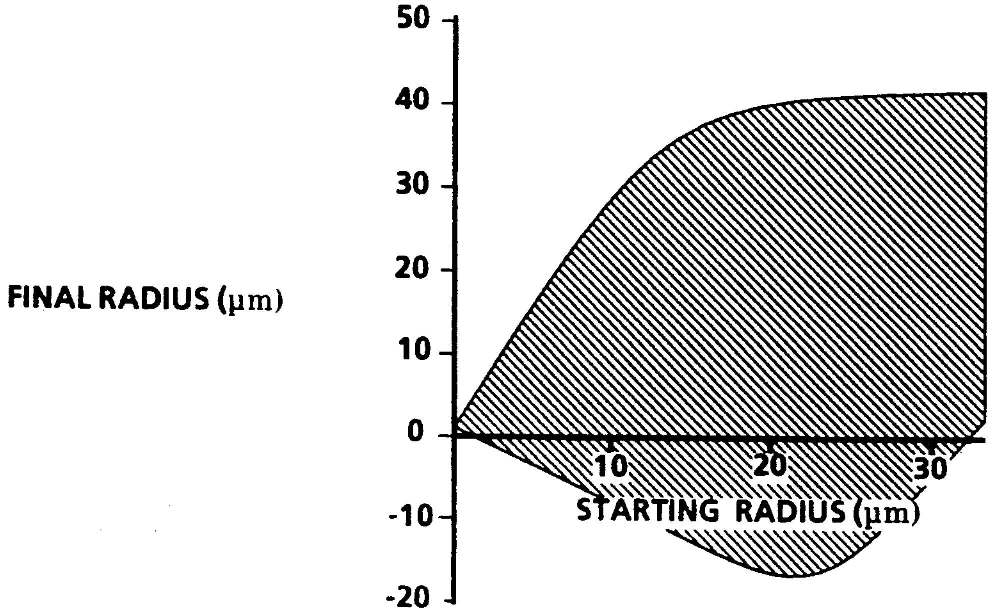
Figure 10:
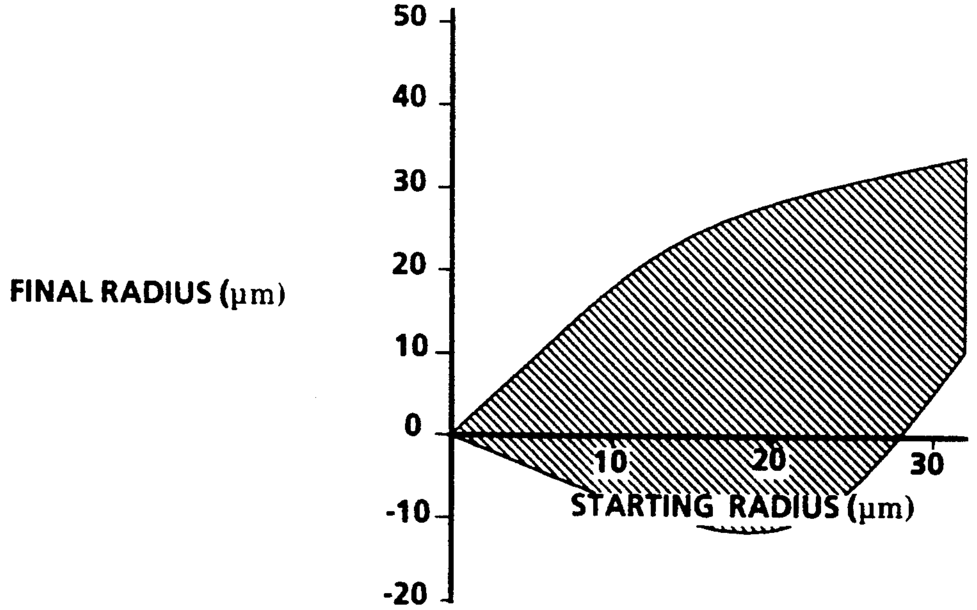
Figure 11:
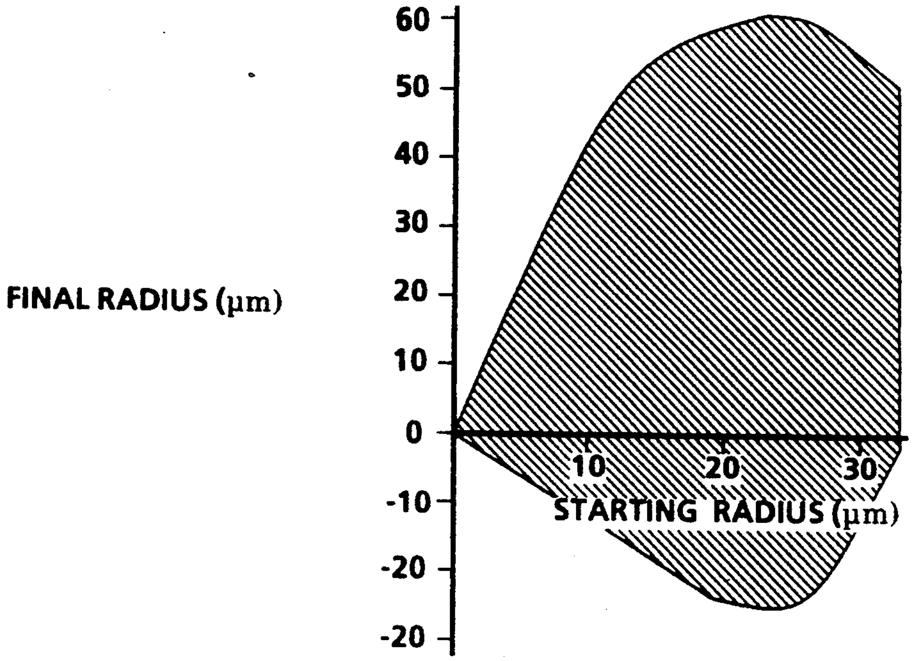
Figure 12:
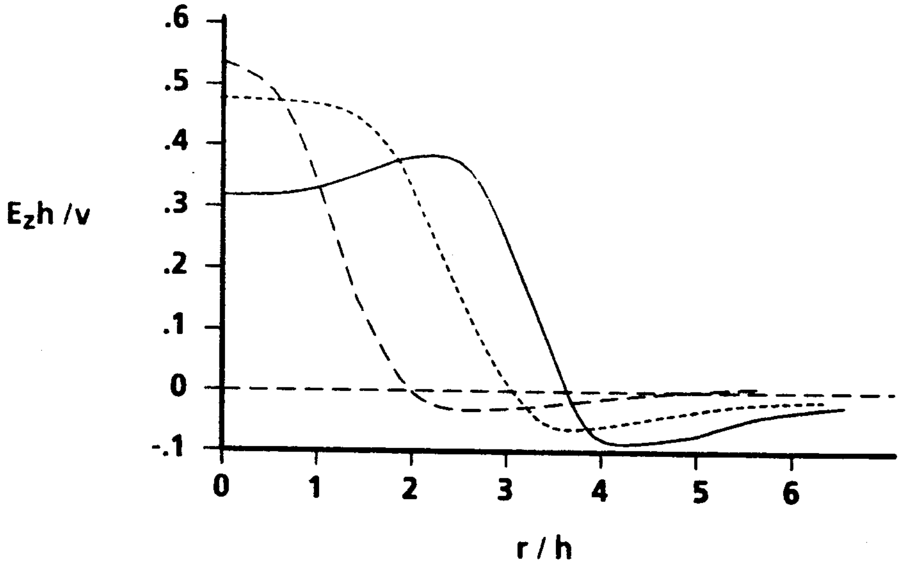

FIG. 7 disclose the outermost trajectories in the field of dipole electrode, the scale factors in x and y directions being different;

FIG. 8 depicts the latitude in detachment times, the times being measured from the beginning of the lead edge of the first detachment;

FIG. 9 shows the ranges of toner radii with a charge of 10 μC/g;

FIG. 10 shows the ranges of final toner radii with a charge of 5 μC/g;

FIG. 11 shows the ranges of final toner radii for toners with charge 20 μC/g; and FIG. 12 depicts the vertical field of a disc electrode at the surface of the dielectric (k=3), for three different ratios of electrode radii to the thickness of the overcoat h (1.35, 2.5, 3.35).

Figure 13:
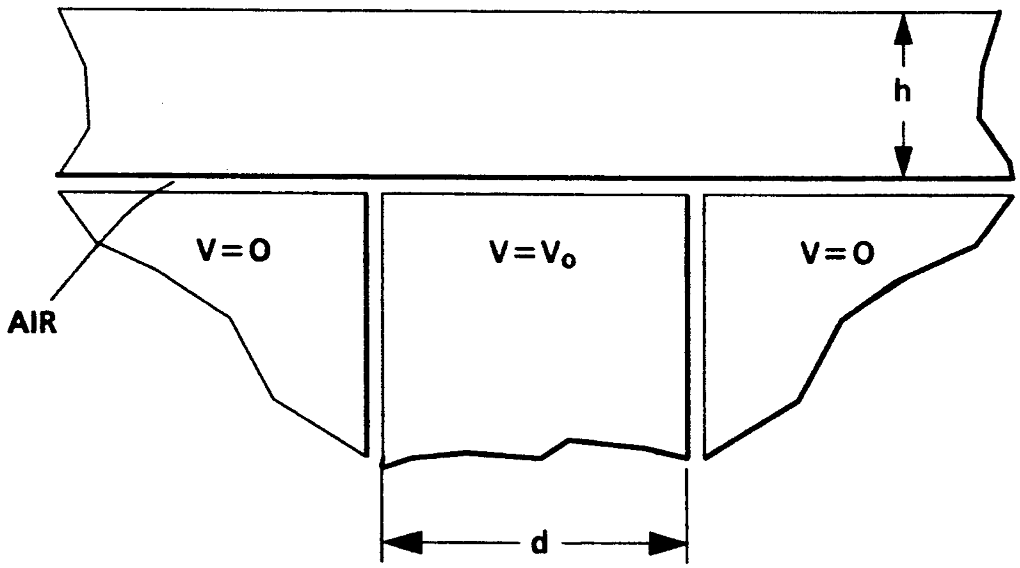

FIG. 13 depicts a simple arrangement suitable for Apertureless Direct Electronic Printing.

DETAILED DESCRIPTION OF THE PREFERRED EMBODIMENT OF THE INVENTION

Figure 1:
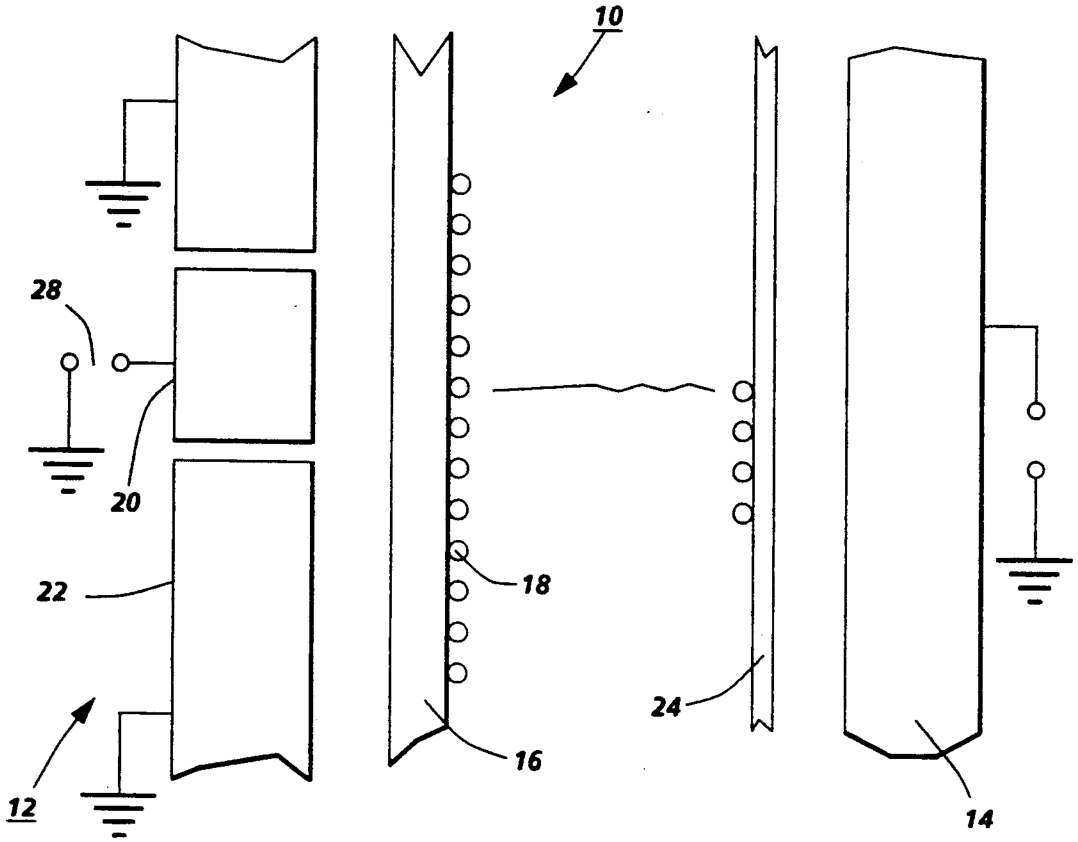
FIG. 1 is a schematic illustration of a printing apparatus incorporating the present invention.

Disclosed in FIG. 1 is a schematic illustration of embodiment of a Direct Electrostatic Printing (DEP) apparatus 10 incorporating the invention.

The printing apparatus 10 includes a toner delivery or conveying system generally indicated by reference character 12 and a backing electrode structure 14.

As disclosed herein, the toner delivery system 12 comprises a donor belt 16 structure for transporting toner particles 18. An array of writing electrode disks 20 (only one shown in FIG. 1) cooperate with grounded electrodes 22 to form an alternating electrostatic field which moves toner particles 18 carried by the donor belt 16 to an image receiver member 24 which may be plain paper.

Figure 2:
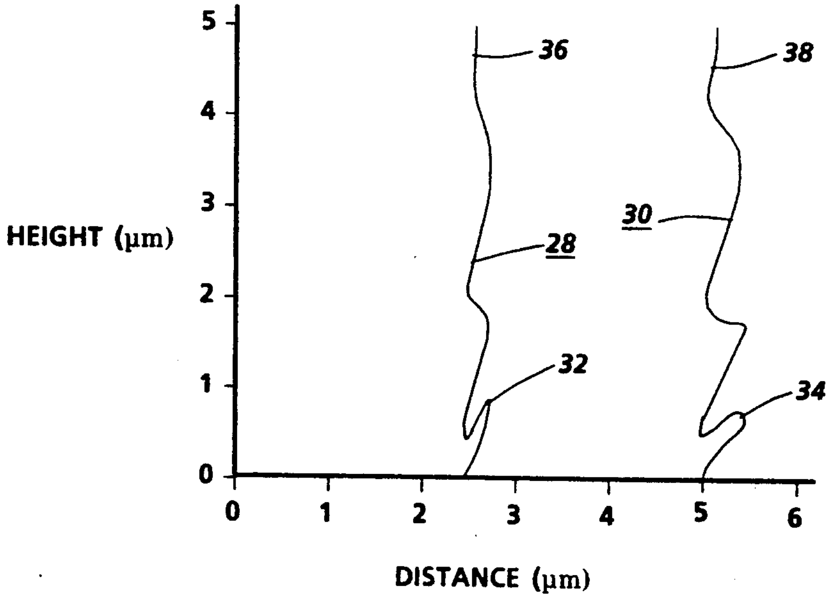
FIG. 2 is a plot of height versus distance representing toner trajectories, starting at a writing electrode and ending at an image receiver, in a time dependent field varying sinusoidally in the abscissa direction, with a spatial period of 50 λm.

Utilizing a voltage power supply 28, an electrode excitation procedure is used which enables the preservation of the resolution in the imagewise gap transfer of toner, by selecting a particular temporal structure of the excitation. The results of this procedure can be best illustrated by reference to FIG. 2, showing the beginnings of two toner trajectories 28 and 30, in case of a field varying sinusoidally in the x direction. In this case, the spacially non-uniform field varied sinusoidally in time as well. It can be seen that the trajectories, originally strongly curved, as indicated at 32 and 34, by the non-uniform, periodic field, develop into essentially straight vertical lines as indicated at 36 and 38. The discovery is in the fact that such desirable trajectories are produced if the trajectories start at time, when the detachment field is at its forward (detaching) maximum, or close to it. In all other cases, either the toner is not detached or a defocusing trajectory occurs.

In accordance with the present invention the first pulse, at the beginning when the toner starts moving from the donor 16 to the paper 24, i.e. the time integral of its amplitude, has an absolute value approximately equal to one half of the next negative impulse, or of the progression of successive alternating impulses.

Figure 3:
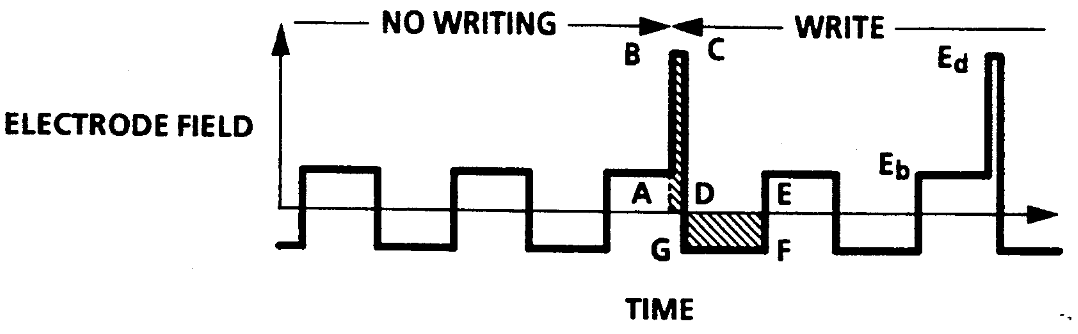
FIG. 3 is an electrical field waveform for the writing electrode having a background field, $E_b$ and a detachment field of $E_d$, the localized field being immersed in the constant and uniform field.

An example of temporal dependence of the imagewise field is shown in FIG. 3. The electrode 20 is at all times biased by a periodically varying (square wave) background field of the amplitude $E_b$ below the toner detachment limit. The toner motion toward the paper starts at a time corresponding to point A when the field increases to a value $E_d$ chosen to be sufficient for toner detachment. The condition for image presevation is that the area of the rectangle ABCD is approximately equal to one-half of the area DEFG.

The temporal period of the field will be significantly smaller than the time to write one pixel in most cases. It is, therefore, possible and it will be beneficial, to issue another detachment pulse a few periods later, as shown on the same FIG. 3, and even to compose a pixel of a packet of such pulses. In such a way, additional toner particles will be detached from the donor by the subsequent pulses, either those which failed to be detached by the first pulse, or the particles brought to the electrode by the moving donor belt 16. In the case of the waveform shown in FIG. 4, when no toner is being transferred (no write) the electrode field has the reversed holding direction which is constant and equal to one half of the peak (absolute) value $E_d$. The writing pulses 42 consist of a packet of 8 μs long square pulses with the maximum forward detachment field. These positive pulses are separated by 20 μs long periods of the reversed field 44. One possible basing scheme for this waveform is shown in FIGS. 5 and 5A, for positively charged toner.

The reversed holding field at the electrode 20 embedded in an insulator 46 together with the grounded electrodes is achieved by positive biasing (+150 V) via power source 48 of the rest of the insulator plane in which the electrode is embedded, while the electrode itself is kept at ground potential. The packet of writing pulses is generated by switching the electrode potential to a high positive value (+450 V shown here) for 8 μs. Many other schemes can be devised utilizing the described principle.

A valid question for any technology with commercial applications is one about its process latitude. The sensitivity to various process and input variations has been tested extensively by the waveform illustrated in FIG. 4 and by the structure shown in FIG. 5 which represent one example of the procedure.

Figure 4:
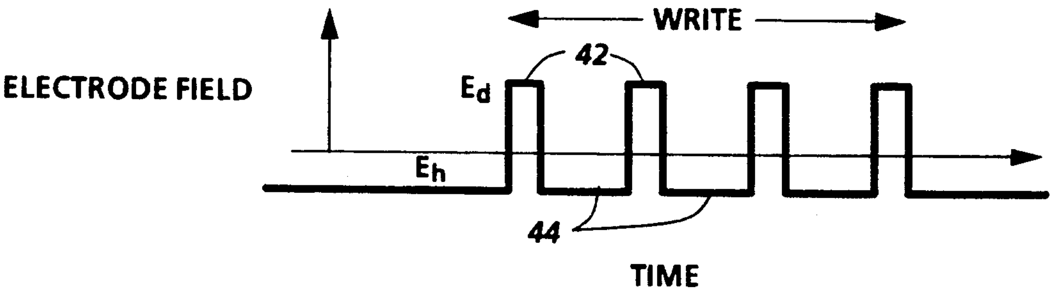
FIG. 4 is another electrical field waveform for a writing electrode having a background field, $E_b$ and a detachment field of $E_d$.
Figure 5:
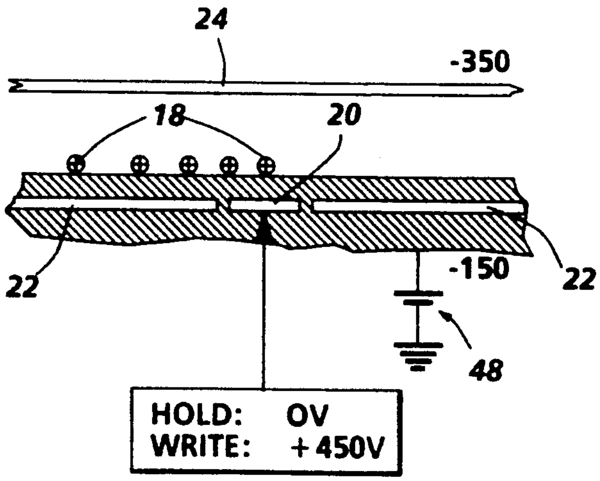
FIGS. 5 and 5A illustrate biasing schemes for the waveform of FIG. 4 for positive toner.
Figure 6:
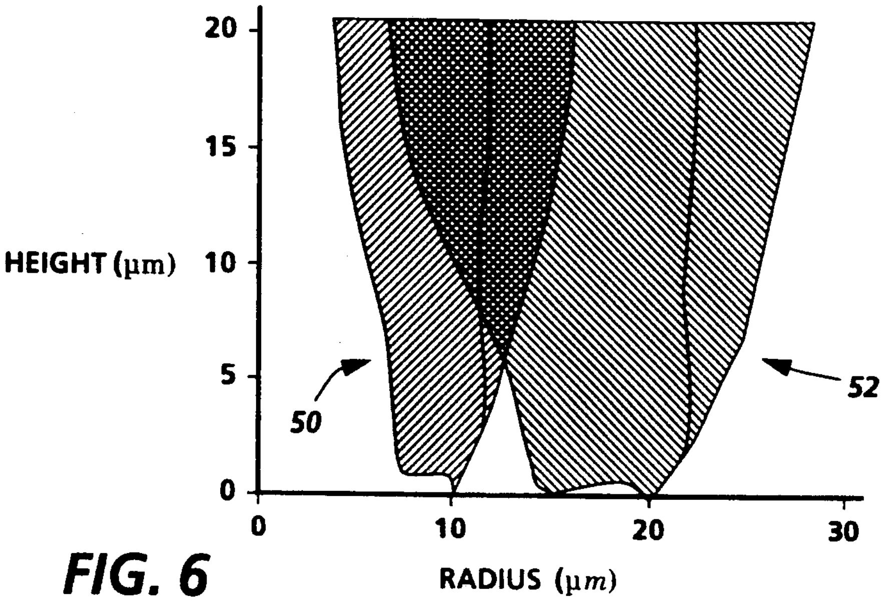
FIG. 6 illustrates two sets of beginning toner trajectories in the field of dipole electrode, the trajectories from the same origin correspond to different detachment times.
Figure 5A:
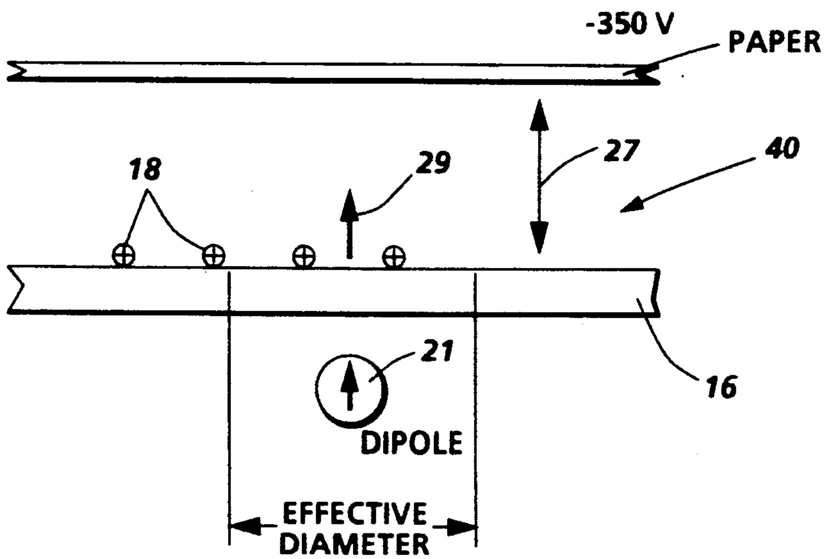

As shown in FIG. 5A, the dipole 20, has a 60 μm effective diameter. The positively charged toner 18 has a 10 μm diameter and tribo equal to 10 μC/g. An air gap 40 is 254 μm (10 mil). A constant gap field 27 is 2 MV/m, a safe value for any gap. A maximum detachment field 29 MV/m is both achievable and close to an optimum detachment field for the toner. The waveform depicted in FIG. 4 was chosen here. Two sets 50 and 52 of toner trajectories, one starting at 20 μm and the other 10 μm from the center of the electrode, are shown in FIG. 6 for the very initial stages of the motion. The outer trajectory of each set is one when the detachment occurs at the very beginning of the pulse. The innermost trajectory is the limiting trajectory for the latest detachment; any toner, detached still later will return back to the donor. Trajectories of toner particles detached anytime between these two times, fill the shaded region of the potential toner beam. Among these trajectories, the one corresponding to the detachment 3 μs after the beginning of the pulse is shown. Toner, detached at this time, is exposed to the high forward field for 5 μs at the start of the trajectory and it arrives at the receiver almost at the same radius as the starting one. Indeed, the mentioned impulse condition is fulfilled here.

The outermost trajectories, started at the very beginning of the 8 μs pulse, intersect the paper plane in the farthest distance from the pixel center. These trajectories, spanning the whole gap are shown in FIG. 7 for different starting radiuses. The largest starting radius is 30 um which is the effective radius (at this location the detachment field is reduced to 50% of its maximum value occurring in the center).

By conducting this numerical study, the process latitude in detachment times has been probed. The results are summarized in FIGS. 8 and 9. In FIG. 8, the window in detachment times (after the beginning of the forward pulse) is shown as a function of toner starting radius. In FIG. 9, the resulting ranges of the final radii, on the receiver, are shown. The "negative" final radii of FIG. 9 represent simply the situation whereby the toner trajectory intersected the electrode axis and the toner arrived, at the opposite side of the starting radius. It is apparent, that even with this spread, the conditions are close to those needed for 300 spots per inch (spi) marking.

As a further step, the latitudes in toner charge were studied. The ranges of the final radii are shown in FIG. 10 for toner with tribo 5 μC/g and in FIG. 11 for toner tribo 20 μC/g. The ranges of allowed detachment times are very similar to those for tribo 10 μC/g. One can see that the spot spreading is increasing with toner charge. It appears, however, still compatible with 300 spi even for 20 μC/g.

Returning to the temporal structure of the writing pulse as shown in FIG. 4, it should be pointed out that several positive and negative pulses can be employed during the time available for writing one pixel. Even at 10 ips, paper speed, and 300 spi resolution, the period of pixel writing is 333 μs; assuming that one half of this time is available for writing process itself, six of these cycles can be used. It is also conceivable, that either the donor belt, bringing new toner to the electrode can move faster than paper, thus availing additional toners for transfer; or then some toners not detached within the temporal window of the first pulse will be detached during the subsequent positive pulses. The transfer conditions for these toner particles will be substantially the same as for those detached during the first pulse of the pixel: the trajectory is almost entirely determined during the first ≈28 μs of its evolution.

All other latitudes of the process are even less constraining than those discussed above. The detachment field of electrode, used here equal to 20 MV/m, is probably close to the limit for air breakdown as well as for the driving electronics. If the toner detachment can be practiced robustly at lower values of the localized field, the spot spreading will be smaller. The uniform gap field 2 MV/m is an unconditionally safe value for any gap; it is quite likely, that a small, 10–20 mil gap can support a higher field. Again, the spot spreading will be reduced with increasing the uniform field in the gap. The toner mass enters into the equations of motion only in relation to charge, as tribo, since the air resistance has only a very small effect. Therefore, the latitude in tribo is well representing the effect of toner size.

It should be stressed that the described embodiments do not exhaust the ways this Apertureless Direct Electronic Printing can be practiced successfully. The purpose of these cases has been to illustrate the basic, broad idea of controlling the spot spreading in imagewise toner transfer by a predetermined temporal structure of the writing pulse.

The simplest electrode suitable for Apertureless Direct Electronic Printing, as depicted in FIG. 13, is a disc conductor, electrically biased against the rest of its plane. The disc and the rest of the plane are covered by a dielectric layer with thickness h. To prevent the electrical breakdown, the gap, between disc and the rest of the plain should be about 3 μm and it should be also filled with dielectric material. Since the useful field will be above the dielectric layer, expected to be 10 μm thick, the effect of the finite gap on this field will be small and the disc electrode can be viewed as embedded in the plane without a gap.

The electrostatic problem of the disc electrode has been solved and the field in the center above the electrode was calculated. The numerical procedure to determine the field profile or the field value of any point, was developed. The results are presented in FIG. 12. The dielectric coefficient of the layer was taken equal to 3; it has been already shown, that dielectric coefficient has only a weak influence on the resulting field. Three cases were calculated, for the three radii of the electrode 1.35, 2.5, and 3.35 in the units of the thickness h. The vertical component of the field on the surface of dielectric $E_z$ is displayed on the FIG. 12, non dimensionally, as a ratio $E_z h/N$ where V is the potential difference between the electrode. Likewise, the radial coordinate is non dimensionalized as the ratio r/h.

Several qualitative features of the calculated field profiles should be pointed out. Firstly, the low absolute value of the negative fringing field is a fortunate development. The small absolute value of the field in the areas where the field has an opposite direction to the main field of the electrode, will assure that the toner particles will not be seeded on the undesirable trajectories far away from the electrode center, where the temporarily varying field in the proposed scheme changes sign. Secondly, if the electrode diameter exceeds about twice the thickness of the dielectric, the field profile exhibits a flat top, even sometimes with a slight dip in the center. This is again a desirable feature which should be utilized in the proposed marking technique. A distribution with a flat top and falling off farther relatively steeply will assure seeding the trajectories from a circle area with a well defined radius which will be important for preserving the resolution.

Turning to the magnitude of the field, the calculations give assurance that high enough fields can be generated by switchable potentials, and also that this switching can be implemented economically. The basing scheme of FIG. 5 may not be the one optimizing the ease of electrode and drive fabrication to attain the highest field. Even this scheme, when used for 50 μm diameter electrode overcoated with 10 μm of dielectric with 10 μm dielectric coefficient of 3 will result in generating the field of 15 MV/m at the flat top section of the distribution.

Unlike the short range adhesion forces, the electrical forces acting on a charged toner particle can be reliably calculated. The total electrical force consists of three forces which can be considered separately. The three forces are Coulomb, image and polarization forces. In the case of detachment of a toner particle from a donor surface, the total electrical force, when of appropriate magnitude and direction, serves the purpose of overcoming the short range adhesive forces and starting the toner particle on its trajectory. The adhesion forces may be weakened by preconditioning which may be also electrically generated.

An earlier modeling developed by me was used to calculate the electrical forces on a charged toner particle. The calculated case was of a 10 μm diameter spherical toner, of a material with dielectric coefficient of 4, charged to uniform surface charge density, placed in contact with a 10 μm thick insulating layer with dielectric coefficient of 3, which in turn, has the other surface conducting and grounded. This toner is exposed to uniform external field with the direction normal to the surface. The total electrical force F is a quadratic form in variables representing toner change and external field. When equivalent potentials were used, here we used directly the toner charge Q and external electrical field E. The detachment force F is expressed as $$F=-AQ^2+BQE-CE2$$

where the dimensional, coefficients A, B, and C are all positive. The first term above is the image force, the second the Coulomb force and the third the polarization force.

For a given toner charge Q the detachment force F is at maximum for the field $$E=BQ/2C$$

and it is equal to $$F=(B/4C-A)Q^2$$

When using toner with a tribo of 10 μC/g, the maximum electrical force is 44.1 mdynes for a detachment field of 14.6 MV/m.

The image and polarization forces are shorter range forces than the Coulomb force. The two holding forces will influence mainly the detachment process and only weakly the trajectories. The effect of image force is to reduce the force in the vertical direction; it will, therefore, slightly reduce the upper limit of detachment time and as a result, also reduce slightly spot spreading. The polarization force will be directed towards the regions of the stronger field; due to this and its short range nature it will actually reduce the spot of the spreading.

What is claimed is:

1. Apertureless direct electrostatic printing apparatus, said apparatus comprising:

a supply of toner;

an image receiving substrate, said supply of toner and said image receiving substrate being positioned with a gap therebetween; and an electrode array for effecting imagewise transfer of toner across said gap with a minimum loss in image resolution; and means for selectively effecting localized, alternating electrostatic fields about the electrodes of said array which fields vary in time such that the approximate impulse relation 1:2 is maintained between a first forward directing pulse and a subsequent reverse pulse.

2. Apparatus according to claim 1 wherein said means for selectively effecting localized, alternating electrostatic fields comprises an alternating power source wherein the time integral of the amplitude of its first pulse has an absolute value approximately equal to one half of the next negative pulse.

3. Apparatus according to claim 2 wherein said alternating power source comprises a periodically varying square wave.

4. The method of depositing toner images in image configuration on a final substrate, said apparatus comprising:

providing a supply of toner;

positioning an image receiving substrate adjacent said supply of toner such that a gap exists therebetween, and using an electrode array, effecting imagewise transfer of toner across said gap with a minimum loss in image resolution; and selectively effecting localized, alternating electrostic fields about the electrodes of said array which fields vary in time such that the approximate impulse relation 1:2 is maintained between the a first forward directing pulse and a subsequent reverse pulse.

5. The method according to claim 4 said step of selectively effecting localized, alternating electrostatic fields is effected using an alternating power source wherein the time integral of the amplitude of its first pulse has an absolute value approximately equal to one half of the next negative pulse.

6. The method according to claim 5 wherein said step of selectively effecting localized, alternating electrostatic fields is effected using a periodically varying square wave.

* * * * *